March 23, 1965   SHIN-ICHI MOTOZAKI ET AL   3,174,986
PROCESS FOR RESOLVING ZINC RACEMIC GLUTAMATE
Filed June 20, 1962

INVENTORS:
SHIN-ICHI MOTOZAKI
MEI OHNO
ISAMU KOMORI
MIYOJI DAZAI

BY

AGENT

United States Patent Office 3,174,986
Patented Mar. 23, 1965

3,174,986
PROCESS FOR RESOLVING ZINC RACEMIC GLUTAMATE
Shin-Ichi Motozaki, Setagayaku, Tokyo, Mei Ohno, Meguroku, Tokyo, Isamu Komori, Kawasakishi, Kanagawaken, and Miyoji Dazai, Yokohamashi, Kanagawaken, Japan, assignors to Ajinomoto Co., Inc., Tokyo, Japan
Filed June 20, 1962, Ser. No. 203,817
Claims priority, application Japan, June 21, 1961, 36/21,354
5 Claims. (Cl. 260—429.9)

The present invention relates to a process for resolving zinc racemic glutamate into its enantiomorphs.

It is the primary object of this invention to provide an easy and cheap process for resolving racemic glutamic acid on an industrial scale into its optically active components and to obtain L-glutamic acid which is useful as a seasoning or an intermediate for the production of seasonings and other products.

Processes for the resolution of racemic glutamic acid in the form of its zinc salt have been proposed, for instance, in U.S. Patent No. 2,937,200 and in Japanese Patent No. 229,862. However, the disadvantages of these conventional processes include the requirement for a special auxiliary resolving agent and/or the relatively low yield of enantiomorphs.

It is generally known that a racemic mixture of glutamic acid enantiomorphs may be resolved into its optically active isomers by seeding a supersaturated solution of the mixture with crystals of one of the isomers to produce the selective crystallization of the one isomer and separating the resultant crystalline isomer. In this seeding process, the solubility of the racemic mixture in the resolving medium plays a very important part in determining the practical results of an industrial scale. Usually, the yield of one optically active isomer obtained in a single seeding operation increases with the solubility of the racemic mixture, i.e. the larger the solubility the more efficient the resolution of the racemic mixture. Considering this from another aspect, the larger the solubility of the racemic mixture in the resolving medium the wider the degree of stable supersaturation of the mixture in the medium, which lessens the danger of contamination of the seeded isomer crystals with the non-seeded antipode crystals and their spontaneous crystallization during the seeding operation.

In accordance with the present invention, the above-described seeding process is applied to a supersaturated solution of zinc racemic glutamate containing additional glutamic acid dissolved therein and having a pH ranging from 7 to 10.5, the term "glutamic acid," unless specifically limited to the free acid, being understood to include glutamic acid in the form of its dissolved salts.

We have found that zinc glutamate (normal salt) decomposes immediately under acidic conditions; that at or near the neutral point, its solubility is very small and that this solubility hardly increases, if at all, up to a pH of 10.0 while it decomposes to precipitate zinc hydroxide at a pH above 10.0. In this same pH range of 7 to 10.5, however, we have found unexpectedly that the solubility of zinc glutamate increases considerably if the solution also contains glutamic acid dissolved therein (see FIGURE 1). We have found further that the molecular ratio of zinc to additional glutamic acid in the solution is constant at any given pH, that zinc glutamate dissolves in an aqueous alkaline solution in proportion to the concentration of glutamic acid therein and that zinc hydroxide is precipitated when the pH of the solution goes above 12.0. At a pH of 6, the molecular ratio of zinc to additional glutamic acid is 0.02, it then increases steadily with an increase in the pH until it reaches the maximum ratio of 0.44 at a pH of 9.5 and it then declines steadily to revert to the value of 0.02 at a pH of 12.0.

The facts discovered by us and apparatus for carrying out the process of the invention based on these discoveries are illustrated in the attached drawing in which.

Figure 1:
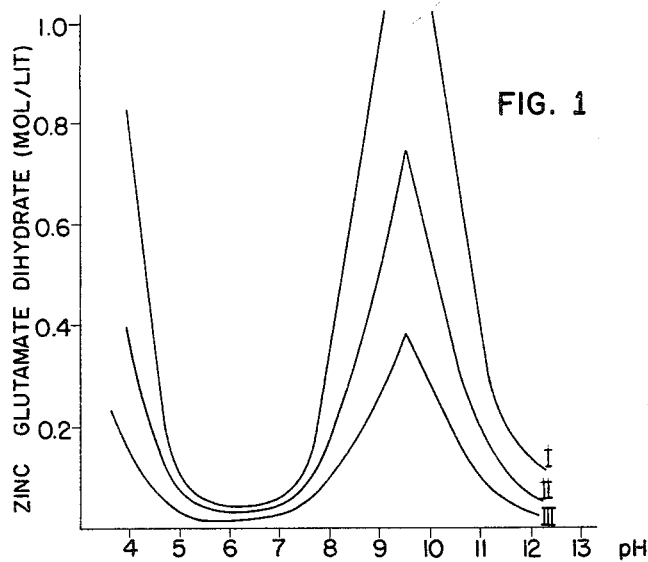
FIG. 1 is a plot of the solubility of zinc glutamate dihydrate in an aqueous medium as a function of pH in the presence of varying amounts of glutamic acid.

Referring initially to FIG. 1, three curves I, II, III illustrate the relationship of molar solubility of zinc glutamate in aqueous solutions which additionally contains glutamic acid or glutamate in amounts of 2.0, 1.0, and 0.5 mols per liter. The solubility increases sharply from pH 7 to a maximum between pH 9 and 10, and increases with the amount of excess glutamic acid present. All values were determined at 25° C.

Figure 2:
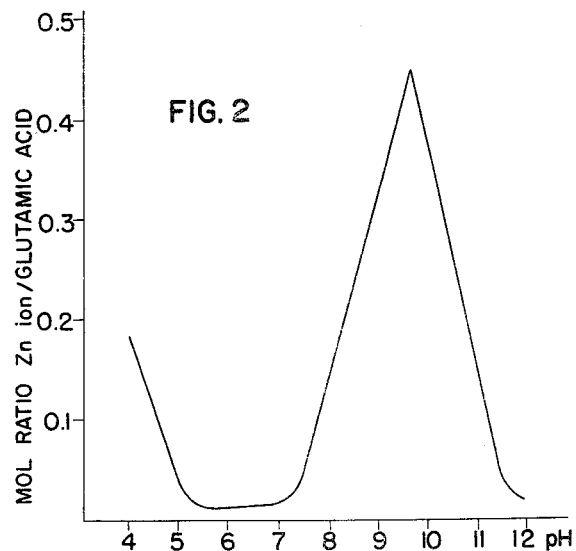
FIG. 2 is a plot of the mole ratio of zinc ion to glutamic acid as a function of the pH value of an aqueous solution saturated with respect to the zinc ions.

FIG. 2 shows the mol ratio of zinc ions to glutamate or glutamic acid at 25° C. in aqueous solutions saturated with respect to zinc ions as a function of solution pH. The highest ratio of zinc to glutamic acid (0.44) being reached at pH 9.5.

The process of this invention for resolving zinc DL-glutamate into its optically active components is based on the facts shown in FIGS. 1 and 2. It is highly effective since the solubility of the zinc racemic glutamate, in the resolving medium, i.e. an aqueous alkaline solution of glutamic acid, is high. For instance, crystallizations of 52% and 65% of the pure optically active isomers of the racemic mixture have been obtained at a pH of 7.0 and 9.5 of the resolving medium. Thus, a high yield of the enantiomorphs is obtained safely and in a single operation, stable crystallization of one optically active component being obtained without crystallization of its antipode.

A further advantage of the process of the present invention lies in the omission of one of the conventional steps used in the industrial resolution of glutamic acid and glutamic acid compounds. In the resolution of racemic glutamic acid, it is desirable to resolve the acid completely, i.e. 100%. If the capacity of the vessel, in which the resolution is carried out, can be reduced in successive steps according to the decreasing volume of the resolving medium used during seeding, the medium is first seeded with crystals of one optically active isomer to crystallize out some of this isomer and the resultant crystals are seperated from the mother liquor before the other isomer begins to crystallize. Next, the mother liquor is seeded with the antipode seed crystals to crystallize the other optically active isomer and the resultant crystals are again separated from the mother liquor before the other isomer are repeated until the entire mixture has been resolved. However, in industrial operations, seeding is often carried out in vessels of a given capacity. In this case, the process of this invention may be carried out simply by replenishing the glutamic acid and zinc components of the resolving medium in the same ratio in which optically active isomers are separated and removed from the medium, instead of decreasing the liquid amount of the medium. Of course, in both instances, the resolution must be discontinued at some point because of the increased concentration of impurities in the resolving medium, which results from the decreasing amount of liquid in the former case and from the repeated replenishments of glutamic acid and zinc in the latter case. The racemic glutamic acid or glutamic acid compound which remains unresolved in the resolving medium must then be recovered to prepare another resolving system.

In the process of the invention, the unresolved racemic glutamic acid is preferably recovered as zinc glutamate and the high yield of recovery may be attributed to the very small solubility of zinc racemic glutamate in the neutral range. In the conventional resolution methods, the recovered precipitate of the zinc glutamate must be converted into free glutamic acid with a strong acid before it is again introduced into a new resolving system. This step may be omitted in the process of the invention because the solubility of zinc racemic glutamate in the alkaline resolving medium containing glutamic acid is very high and, therefore, the recovered zinc racemic glutamate crystals may be placed directly into the medium and will be dissolved therein.

Yet another advantage of the present invention resides in the fact that racemic glutamic acid may be used in the resolving medium in the form of its alkaline solution so that no neutralizing acid is required. The resolution may be effected directly with a solution obtained in the synthesis of racemic glutamic acid with no necessity of either isolating or purifying the glutamic acid before using it in the resolving system. For example, if racemic glutamic acid is synthesized by hydrolyzing α-aminoglutarodinitrile with caustic soda, there is obtained a strongly alkaline glutamate solution, and a large amount of a neutralizing acid is required in the conventional resolving processes to recrystallize the racemic glutamic acid therefrom before the resolving medium may be prepared therewith and separation of the glutamic acid. Little, if any neutralizing acid is needed for the preparation of a resolving medium according to the present invention with such alkaline glutamic acid solutions obtained by synthesis, nor are the crystallizing and separating steps required.

The process of this invention is quite simple and proceeds as follows:

A supersaturated solution of zinc racemic glutamate may be prepared in any suitable way. For instance, the glutamate may be dissolved in an aqueous alkaline solution of racemic glutamic acid. Alternatively, a water-soluble zinc salt, such as zinc chloride or zinc sulfate, may be dissolved in an alkaline solution of racemic glutamic acid. The resultant solution constitutes the resolving medium. It must be supersaturated with respect to the zinc racemic glutamate, preferably to a supersaturation level of at least about 0.1%, based on the saturation level of the solution in respect of the glutamate, and more preferably a supersaturation level of more than 1%. This supersaturated solution is adjusted to a pH range of 7 to 10.5 and has an amount of glutamic acid dissolved therein in a ratio of more than one mol of acid per zinc ion.

This resolving solution is seeded with crystals of one of the optically active isomers, i.e. zinc L- or D-glutamate. After seeding, it is preferred to proceed with any of the methods used in conventional seeding processes of this type to facilitate the selective crystallization of the seeded optically active isomer, for instance by stirring the seeded resolving medium. It is also preferred, to apply the other conventional procedures used in seeding processes, such as replenishing the zinc and racemic glutamic acid sources in the medium, concentrating, cooling and pH adjustment, which is particularly important in the process of the present invention to compensate for the decreasing supersaturation due to the crystallization of the enantiomorphs and to maintain the alkalinity of the resolving medium in the critical range of 7 to 10.5. As was pointed out hereinabove, the solubility of the zinc glutamate decreases gradually with decreasing pH within the range of 9.5 to 6 at a given concentration of the co-dissolved glutamic acid.

The optically active zinc glutamate crystals are then separated from the mother liquor. Either immediately or after replenishing the mother liquor with suitable amounts of racemic glutamic acid and zinc ion sources, the medium is then seeded with crystals of the antipode zinc glutamate, the above crystallization procedures are followed and the antipode crystals are removed.

The zinc glutamate enantiomorphs removed from the resolving medium are converted to free optically active glutamic acid in any suitable manner. For example, the zinc glutamate may be dissolved in an equivalent amount of dilute sulfuric or hydrochloric acid to crystallize free glutamic acid. Ion-exchange resins may also be used. The zinc ions remaining in the solvent after the free glutamic acid has been separated from the mother liquor may be used as a zinc source for preparing another batch of resolving medium.

Figure 3:
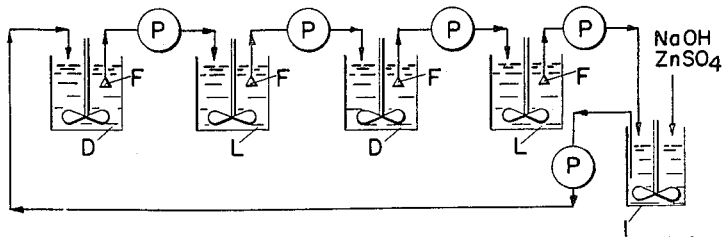
FIG. 3 illustrates apparatus for carrying out the resolution process of the invention in a conventional manner.

In a preferred embodiment of the present invention, optically active isomers of high purity are more consistently produced in a shorter time by passing the resolving medium through a system of interconnected resolving zones constituted by a series of vessels wherein the zinc racemic glutamate is resolved into its optically active isomers. This process is schematically shown in FIG. 3 of the accompanying drawing.

As shown, this system includes a make-up or storage tank 1 for the resolving medium containing an aqueous solution of racemic glutamic acid and caustic soda to which sufficient zinc sulfate is fed to form a supersaturated solution of zinc racemic glutamate having glutamic acid dissolved therein, with the pH of the supersaturated solution being adjusted to a range of 7.0 to 10.5. The resolving medium is circulated by pumps P through a series of resolving vessels, alternate vessels D containing D-glutamate crystals as seeds and vessels L containing zinc L-glutamate crystals as seeds. A stirrer or like agitating means is provided in each vessel and in the storage tank to keep the resolving medium constantly well mixed and a screen or filter F is provided between the resolving vessels to prevent crystals from passing to the next vessel while permitting the free flow of the mother liquor. Thus, two pairs of resolving vessels are provided in the system, one pair containing one enantiomorph seed crystal type while the other pair of vessels contains the antipode crystal type, the resolving vessels of each pair alternating with each other so that the resolving medium flows from a vessel with one type of seed crystals into a vessel containing the antipode type of seed crystals. Finally, the resolving medium returns from the last resolving vessel to the make-up or storage tank where it is replenished. As will be appreciated, this system provides a continuous process of resolution.

In the seeding process for producing an optically active isomer of a racemic mixture, the supersaturation of the resolving medium in respect of this isomer decreases proportionally with the progressive crystallization thereof and its removal from the mother liquor while the antipode remains at its original level. This may lead to the spontaneous crystallization of the antipode, which deteriorates the optical purity of the desired enantiomorph. Also, the decreasing level of supersaturation of the resolving medium in respect of the desired enantiomorph, which accompanies its crystallization and separation of the enantiomorph crystals from the mother liquor, reduces the crystallization velocity and thus causes an increase in the time required for resolution.

These disadvantages are avoided with the continuous resolving system described hereinabove and illustrated in the accompanying drawing. In this system, the seed crystals are either contained in the resolving vessels or they may be supplied to the circulating supersaturated solution. As is conventional in seeding processes of this type, the resolving medium is cooled, replenished to maintain the desired concentration of components, stirred and adjusted in respect of its critical pH range. In this system, the concentration or saturation difference between the desired enantiomorph and its antipode may be substantially eliminated and, therefore, an enantiomorph of higher optical purity may be obtained therein. A decrease in the crystallization velocity may be readily avoided by suitably replenishing the glutamic acid and zinc ion sources in the circulating resolving medium, as the concentration of these components deviates from the original and desired level. In this manner, the required time for the resolution is considerably shortened.

While in no way limiting the invention, the following examples will illustrate the practice thereof.

*Example 1*

A resolving medium was prepared by dissolving 1000 g. (4878 mM.) of monosodium racemic glutamate dihydrate in 10 l. water (pH: 7.02) and 310 ml. of a 2 M aqueous solution of zinc sulfate (620 mM.) was added to the solution while the same was thoroughly stirred. This medium was circulated through the resolving system illustrated in the accompanying drawing FIGURE 3 at a rate of 5 l./hour. In the make-up or storage tank 1, a 2 M aqueous solution of zinc sulfate was added to the circulating mother liquor and the pH of the said solution was adjusted to 7.0 by adding a 6 N aqueous solution of sodium hydroxide thereto. The thus replenished and adjusted solution was recirculated through the system. Each of the resolving vessels contained 300 g. of crystal seeds, the D vessels containing zinc D-glutamate crystals and the L vessels containing zinc L-glutamate crystals (1217 mM.). After six hours, the contents of the D resolving vessels and of the L resolving vessels were gathered separately and the grown crystals were separated from the mother liquors and washed. The thus obtained crystal crops showed the following yields, total nitrogen, optical rotation $[\alpha]_D^{25}$ and optical purity respectively:

Zinc D-glutamate: 968 g., 4.78%, −15.9°, more than 99%.

Zinc L-glutamate: 913 g., 4.92%, +16.4°, more than 99% (the sample being dissolved in a 7% aqueous solution of hydrochloric acid and its optical rotation measured).

The crystallization yields of zinc D- and L-glutamate correspond both to 35.7% (by mol), based on the original glutamate charge and taking into account the used seed crystals.

*Example 2*

Five kg. of an alkaline aqueous solution of racemic glutamic acid obtained by synthesis in the afore-described manner (glutamic acid content 20.5%, pH 12.5) were thoroughly mixed with 205 g. of a 20% aqueous solution of sulfuric acid and 5 l. water to adjust the pH of the solution to 10.5. Zinc racemic glutamate was dissolved in this solution until the glutamate had saturated the solution. This mixture was filtered to produce 11.292 kg. of a clarified resolving medium containing 14.87% of glutamic acid and 2.58% zinc glutamate. This resolving medium was circulated through a resolving system, as in Example 1, but at an hourly rate of 2 l. Each resolving vessel contained 300 g. of seed crystals but 374 ml. of a 2 M aqueous solution of zinc sulfate was added to each of the vessels at an hourly rate of 94 ml. for about 4 hours. The circulation was continued for six hours and the grown crystals were separated from the mother liquors, as in Example 1. The thus obtained crystal crops showed the following yields of total nitrogen, optical rotation $[\alpha]_D^{25}$ and optical purity, respectively:

Zinc D-glutamate: 1382 g., 4.79%, −15.7°, more than 99%.

Zinc L-glutamate: 1375 g., 4.79%, +15.8°, more than 99%.

The crystallization yields of zinc D- and L-glutamate correspond to 40.2% and 39.7% (by mol), based on the original glutamate charge and taking into account the used seed crystals.

*Example 3*

One kg. of an alkaline aqueous solution of racemic glutamic acid obtained from acrylonitrile by the oxo and Strecker reaction (glutamic acid content 20.7%, pH 12.5) was thoroughly mixed with 230 g. of 20% sulfuric acid to adjust the pH of the solution to 9.9. Added to this solution were 1.88 kg. of the mother liquor of a previous resolving operation, which contained 4.32% DL-glutamic acid and 0.768% zinc, and 267 g. of zinc DL-glutamate, which contained 48% DL-glutamic acid and 21.3% zinc. The mixture was thoroughly stirred to produce a solution having a pH of 7.8 and this solution was divided into two parts. One part was poured into a beaker of 5 l. capacity, which contained 35 g. of zinc D-glutamate crystals, and the other part was poured into a beaker of the same capacity and containing the same amount of zinc L-glutamate crystals. The beakers were interconnected by tubes having filtering screens at their ends. Crystallization was carried on for three hours while the resolving medium was stirred adding over the period of one hour 1.23 kg. of the mother liquor left over from a preceding resolving operation, the resolved glutamic acid crystals having been separated from the liquor and the liquor containing 1.25% glutamic acid and 5% of zinc, and subjecting the resolving medium to interchange through the connecting tubes between the beakers. After the crystallization was terminated, the crystals were filtered from the mother liquor, with a yield of 272 g. of zinc D-glutamate, 268 g. of zinc L-glutamate and 9.14 kg. of mother liquor.

225 g. of the obtained zinc D-glutamate was dissolved in a beaker of 2 l. capacity in 7.20 g. of 10% sulfuric acid and the resultant solution was left standing in the beaker for crystallization. The crystallized D-glutamic acid was filtered off and washed. The yield was 104 g. of D-glutamic acid (8.68% total nitrogen, $[\alpha]_D^{25}$ −28.8° and optical purity more than 99%). The yield of L-glutamic acid was 105 g. (8.66% total nitrogen, $[\alpha]_D^{25}$ +28.7° and optical purity more than 99%) obtained from 225 g. of zinc L-glutamate in the same manner. The combined amount of mother liquor and washings was 1.92 kg. and this was used in the following resolving operation.

6.88 kg. of the other part of the first-prepared resolving medium was reserved for a subsequent resolution whereas 2.26 kg. of this solution was mixed with 0.69 kg. of the mother liquor obtained in a previous operation and containing 1.25% glutamic acid and 5.0% of zinc, 15.6 g. of a 30% aqueous solution of caustic soda and 40 g. of a 25% aqueous solution of zinc sulfate. After this mixture was stirred for 15 hours (pH 7.4), crystallized zinc DL-glutamate was filtered from the mother liquor. The crystals contained 49.2% glutamic acid and 21.9% zinc and the yield thereof was 221 g. These racemic crystals were used as a component in a subsequent preparation of resolving medium and the mother liquor (2.78 kg.) was discarded.

While the invention has been described and exemplified in connection with certain preferred embodiments, it will be understood that many variations and modifications may occur to the skilled in the art without departing from the spirit and scope of this invention as defined in the appended claims.

What we claim is:

1. A process of resolving a racemic mixture of zinc glutamate into its optically active enantiomorphs which comprises:

(a) seeding an aqueous solution of zinc racemic glutamate and of additional glutamic acid with seed crystals of one of said enantiomorphs, (1) the solution having a pH between 7.0 and 10.5, and (2) the solution being supersaturated in respect of the zinc racemic glutamate, (3) whereby additional amounts of said one enantiomorph are deposited on said seed crystals; and (b) separating the crystals from the solution.

2. The process of claim 1 wherein said solution contains said additional glutamic acid and said zinc racemic glutamate in a ratio of more than one mole of said acid per mole of said glutamate.

3. The process of claim 1, wherein the pH of the resolving solution is 9.5.

4. A process of continuously resolving a racemic mixture of zinc glutamate into its optically active enantiomorphs which comprises:
 (a) preparing an aqueous solution of zinc racemic glutamate and of additional glutamic acid,
  (1) the solution having a pH between 7.0 and 10.5, and
  (2) the solution being supersaturated in respect of the zinc racemic glutamate;
 (b) continuously circulating the supersaturated solution through a plurality of resolving zones interconnected in series,
  (1) selected ones of said zones containing seed crystals of one of said enantiomorphs while other ones of said zones interposed between said selected zones in said series contain seed crystals of the antipode of said one enantiomorph;
 (c) filtering the circulating solution between said zones to retain crystals and permit passage of the liquid component of the solution; and
 (d) separating the crystals from the mother liquor in each zone.

5. The process of claim 4, wherein said solution, as prepared, contains more than one mole of said additional glutamic acid per mole of said zinc racemic glutamate.

References Cited by the Examiner
UNITED STATES PATENTS
2,882,302 4/59 Fike _____ 260—707

OTHER REFERENCES
Chemical Abstracts, vol. 52, column 11905 (1958) (abstracting Japanese Patent No. 9,022 of 1956).

TOBIAS E. LEVOW, *Primary Examiner.*